United States Patent

[11] 3,625,798

| [72] | Inventor | Vincent V. Ihli<br>1347 Peterson St., Long Beach, Calif. 90813 |
|---|---|---|
| [21] | Appl. No. | 889,193 |
| [22] | Filed | Dec. 30, 1969 |
| [45] | Patented | Dec. 7, 1971 |

[54] TAPING TOOL
4 Claims, 8 Drawing Figs.

[52] U.S. Cl. .................................................. 156/523,
156/526, 156/530, 156/574, 156/577
[51] Int. Cl. ...................................................... B44c 7/02
[50] Field of Search ........................................... 156/577,
574, 584, 526, 523, 524, 525, 527, 530

[56] References Cited
UNITED STATES PATENTS

| 3,116,195 | 12/1963 | Lathrop et al. | 156/525 |
| 2,909,301 | 10/1959 | Fritzinger | 156/584 X |
| 3,097,986 | 7/1963 | Kauer | 156/577 X |
| 3,463,694 | 8/1969 | De Roshia | 156/577 X |

Primary Examiner—Benjamin A. Borchelt
Assistant Examiner—G. E. Montone
Attorney—William C. Babcock ABSTRACT: A device and method of using the same to apply tape of a desired length to a generally flat surface, said tape prior to application being spiral wound on a reel, and the exposed surface of the bonding material on the tape, commonly referred to as mud in the trade, covered with a thin, pliable, reusable film of a plastic material that lightly adheres thereto. The film serves the dual function of preventing the bonding material from drying prior to application of the tape to said surface, and the spiral wound layers of the tape from adhering to one another. In addition, an apparatus is disclosed for forming the tape, as well as a protective package in which it may be retailed.

PATENTED DEC 7 1971
3,625,798
FIG.1 FIG.2
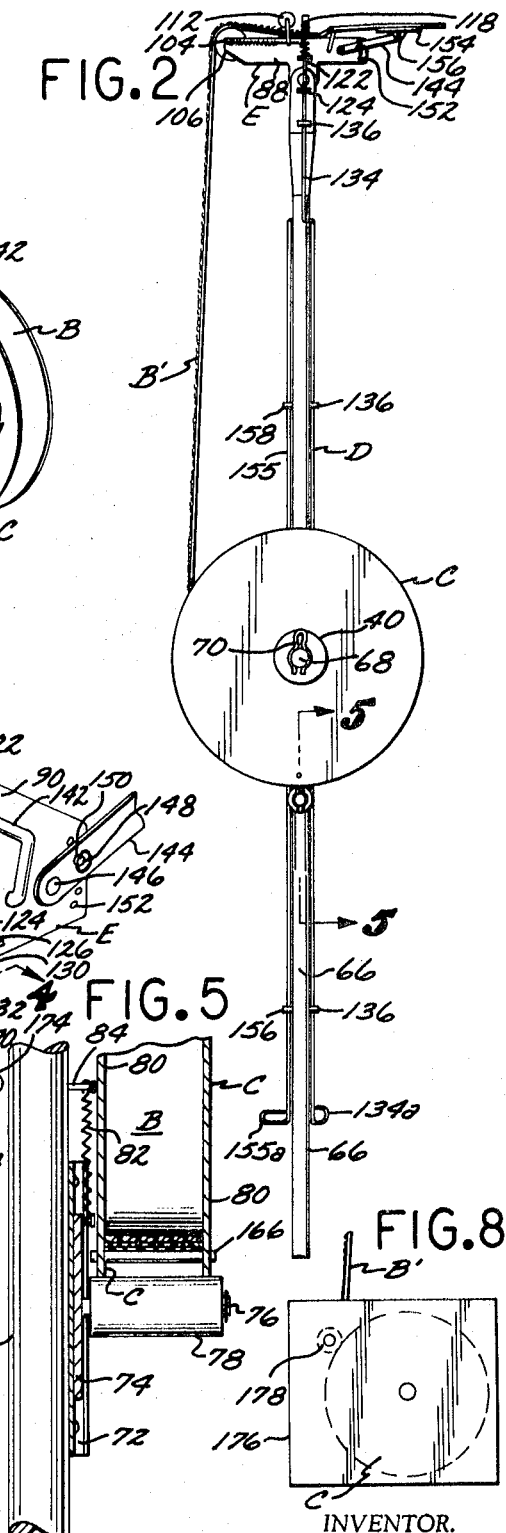
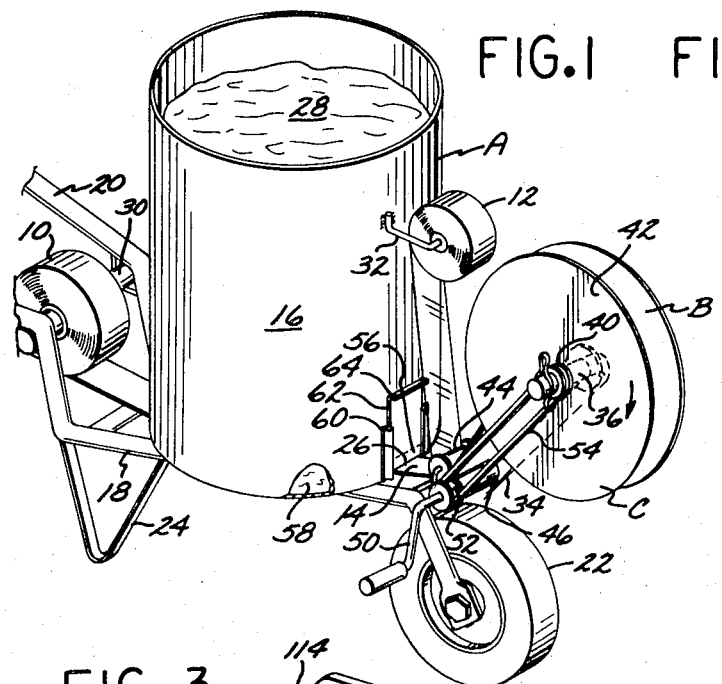
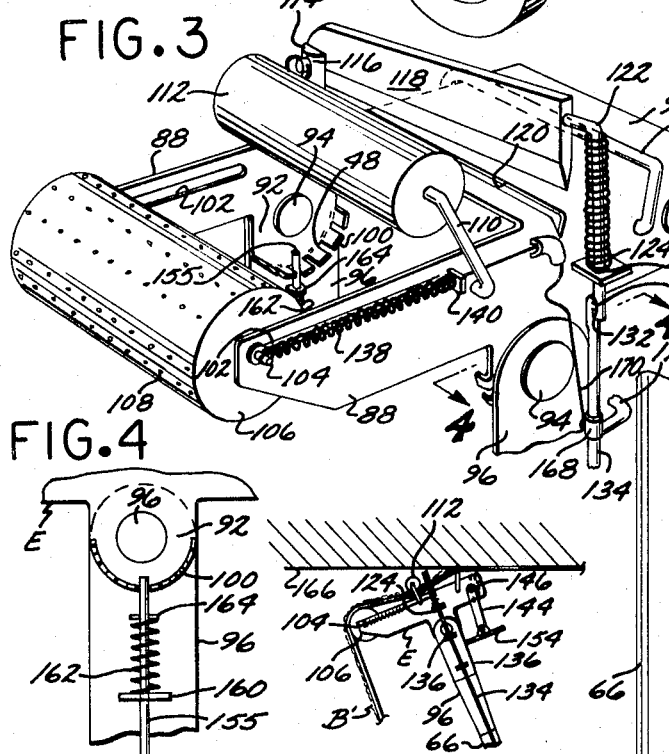
FIG.3
FIG.4
FIG.6
FIG.7
FIG.8
INVENTOR.
VINCENT V. IHLI
BY
William G. Babcock
ATTORNEY 3,625,798

TAPING TOOL

BACKGROUND OF THE INVENTION

1. Field of the Invention

A taping tool and method of using the same, as well as an apparatus for forming tape that is coated on a first side with a layer of a bonding material (mud), and the exterior surface of the bonding material having a thin pliable film lightly adhered thereto to prevent said bonding material from drying, as well as layers of the tape from adhering to one another when wound in a spiral configuration on a reel.

2. Description of the Prior Art

Wallboard is attached as abutting sheets to studs and joists to define walls and ceilings in modern building structures. The cracks between the sheets, as well as imperfections in the sheets are masked with tape, prior to said wallboards having one or more coats of a finish material applied thereto. The application of tape to wallboard for the above described purpose has in the past been a slow, laborious, and costly process, particularly when scaffolding or a ladder must be used to apply tape to a ceiling.

The purpose of the present invention is to substantially eliminate the operational disadvantages of applying tape to wallboard that are inherent to prior art devices and methods used for this purpose.

SUMMARY OF THE INVENTION

A device that includes an elongate member of sufficient length to reach a ceiling when held by an operator. Said device rotatably supporting a reel on which tape is spirally wound, and the tape extending to a head on a first end of the member from which the tape may be applied in a desired length to a ceiling without the use of a ladder or scaffolding.

In addition, another device is provided to apply a bonding material (mud) as a layer to a first side of a tape, and thereafter to cover the bonding material with a pliable film of plastic or other sheet material that lightly adheres thereto. Thereafter, the composite tape is wound in spiral form on a reel that may be removably and rotatably supported on the tape-applying device. The reel may also be removably supported within the confines of a housing to permit the tape to be dispersed therefrom in a desired length.

BRIEF DESCRIPTION OF THE DRAWINGS

FIG. 1 is a perspective view of a first form of apparatus to concurrently apply a bonding material to a first side of tape and cover said bonding material with a pliable film, with the composite tape so formed being wound in spiral configuration on a reel;

FIG. 2 is a side-elevational view of a second form of apparatus to apply tape to a ceiling or a high portion of a wall without the use of scaffolding or a ladder;

FIG. 3 is a perspective view of the tape-applying head of the second form of the apparatus;

FIG. 4 is a fragmentary transverse cross-sectional view of the second form of apparatus taken on the line 4—4 of FIG. 3;

FIG. 5 is a fragmentary longitudinal cross-sectional view of the second form of apparatus taken on the line 5—5 of FIG. 2;

FIG. 6 is a side-elevational view of the head of the second form of apparatus applying tape to a ceiling, but with a trowel that forms a part of the head in a depending, nonoperative position;

FIG. 7 is the same side-elevational view shown in FIG. 6, but with the trowel in an upwardly disposed operative position; and FIG. 8 is a side-elevational view of a portable package from which the tape can be dispensed as required.

DESCRIPTION OF THE PREFERRED EMBODIMENTS

A first form of apparatus A is shown in FIG. 1 in which a roll of strip paper 10 or like material and a roll of thin pliable film 12 are so rotatably supported that a layer 14 of a bonding agent may be applied to a first side of the paper and the film lightly adhered to the external surface of the bonding agent to provide a composite tape B that is spiral wound on a reel C.

The first form of apparatus A includes a container 16 that is supported on a suitable frame 18. In the embodiment of the frame 18 shown in FIG. 1, the frame is of wheelbarrowlike structure, and includes rearwardly extending handle means 20 and a forwardly disposed wheel 22 to permit the frame to be moved easily to a desired location. Supports 24 extend downwardly from the rearward portion of the frame 18, which supports when contacting the ground surface (not shown) maintain the portion of the frame on which container 16 rests in a substantially horizontal position.

Container 16 has two diametrically opposed slots 26 formed in the lower portion thereof, and through which slots a section of the strip paper 10 extends. A quantity of conventional fluid bonding agent 28, commonly referred to as mud in the construction industry, is disposed in container 16 as shown in FIG. 1.

A transverse shaft 30 is removably supported from the rearward portion of frame 18 by conventional means, which shaft rotatably supports the roll of paper 10 in alignment with the slots 26. A bracket 32 is mounted on the forward side of container 16 a substantial distance above the slots 26 and vertically aligned therewith, which bracket removably and rotatably supports a roll of the film 12.

As the strip paper from roll 10 is drawn through slots 26 a layer of bonding agent 28 is applied to a first side of the paper. The thickness of the layer of agent 28 so applied is determined by the depth of the slots 26.

An arm 34 extends upwardly and forwardly from frame 18. The arm on its free end supports a stub shaft 36 on which a reel C is rotatably and removably supported in vertical alignment with slots 26. Reel 38 has a pulley 40 extending outwardly from a first side 42 thereof. First and second guide rollers 44 and 46 are disposed intermediate container 16 and reel 38. First roller 44 is rotatably supported on a transverse shaft 48 secured to frame 18. The second roller 46 has one end thereof journaled by conventional means (not shown) on arm 34. Second roller 46 may be rotated by a crank 50 that projects outwardly therefrom as shown in FIG. 1. The second roller 46 has a groove 52 therein that is engaged by an endless resilient belt 54 that extends to pulley 40.

First and second rollers 44 and 46 are vertically spaced, and to the degree that film 12 from the roll thereof is forced into light pressure contact with the layer of bonding agent 28 on strip paper 10, as the paper and film are moved between the rollers to form composite film B.

The forwardly disposed slot 26 shown in FIG. 1 is of adjustable depth to permit a layer 14 of the bonding agent of desired thickness to be applied to the paper 10 from the roll thereof. The slot 26 is a part of an opening 56 that extends upwardly in the sidewall of container 16 from the bottom 58 of the latter. Opening 56 has two spaced vertically extending guides 60 at the ends thereof, which guides slidably and frictionally engage an arcuate plate 62 that has a forwardly extending lip 64 at the top thereof. By gripping the lip 64 the plate 62 may be moved vertically relative to the bottom 58 to vary the depth of the slot 26 and the thickness of the layer 14 of bonding agent that will be applied to strip paper 10. The guide rollers 44 and 46 serve to force strip film 12 from the roll thereof as shown in FIG. 1 into adhering contact with layer 14, as the strip paper and film from the rolls 10 and 12 are drawn between the rollers by turning crank 50.

The composite film B resulting from the above-described operation is spirally wound on the reel C. After the reel C has had a desired quantity of composite tape B wound thereon, the reel C may be removed from shaft 36 by disengaging a resilient clip 68 therefrom, which clip is shown in FIG. 1.

A second form of apparatus D that utilizes the reel C having the composite tape B wound thereon is shown in detail in FIGS. 2 to 5 inclusive. Second apparatus D includes an elongate rigid member 66 of sufficient length to extend to a ceiling of a structure when held by a user (not shown). The apparatus D has a tape applying head assembly E supported on the upper end thereof as shown in FIG. 2.

A stub shaft 68 extends outwardly from the lower portion of member 66 and removably and rotatably supports the reel C thereon. The reel C is removably held on shaft 68 by a resilient clip 70. Two laterally spaced, longitudinally extending guides 72 are secured to member 66 below shaft 68 and slidably support an elongate rigid bar 74 therebetween.

A stub shaft 76 projects outwardly from bar 74 between guides 72. The shaft 76 removably and rotatably supports a roller 78 of greater length than the thickness of reel C. The circular sides 80 of reel C frictionally engage roller 78. A tensioned helical spring 82 best seen in FIG. 5 is connected to the upper end of bar 74 and to a pin 84 that extends outwardly from member 66.

Head E includes a frame 86 shown in FIG. 3 that has two laterally spaced parallel sidepieces 88 that are connected on their forward ends by a transverse web 90. Two extensions 92 depend from side pieces 88 and are pivotally engaged by rivets 94 to support the frame 86 from a bifurcated upper end portion 96 of elongate member D. Each extension 92 has an arcuate lower edge 98 from which a number of circumferentially spaced teeth 100 project inwardly as shown in FIG. 3. Sidepieces 88 have longitudinally slots 102 in the rearward portions thereof that slidably support a transverse shaft 104 on which a feed roller 106 is mounted.

Roller 106 has a plurality of spaced short pins 108 or other paper engageable means on the exterior surface thereof. A bail 110 projects upwardly from frame 86 forwardly of roller 106. The bail 110 rotatably supports a guide roller 112.

A lug 114 extends upwardly from one of the side pieces 88 rearwardly of web 90. A pin 116 extends through lug 114 and pivotally supports a transverse cutting blade 118. Blade 118 is vertically aligned with a transverse slot 120 formed in web 90.

The blade 116 has a downturned L-shaped rod 122 secured to a first end 122 thereof. A guide plate 124 extends outwardly from one of the sidepieces as shown in FIG. 3. The plate 124 has a short transverse slot 126 therein that is slidably engaged by the lower portion of rod 122.

A compressed helical spring 128 encircles the portion of rod 122 normally positioned relative to plate 126, and at all times tends to maintain the blade 118 in the upwardly disposed first position shown in FIG. 3. Rod 122 has a first engageable cam surface 130 on the lower portion thereof that is engaged by an engaging second cam surface 132 formed on the upper end of an elongate actuating member 134. The actuating member 134 is slidably supported on member 66 as shown in FIG. 2 by a number of spaced guides 136.

The shaft 104 as may best be seen in FIG. 3 has two compressed helical springs 138 extending forwardly therefrom. The springs 138 on their forward ends are secured to two lugs 140 that project outwardly from sidepieces 88.

A transverse inverted L-shaped wiper bar 142 is secured to frame 86 forwardly of blade 118. An arm 144 has a rearward end portion pivotally secured to one of the sidepieces 88 by a rivet 146 or other suitable pivot support as may best be seen in FIG. 3. A PIN 148 is provided that extends through an opening 150 in the arm and any desired one of a number of arcuately spaced openings 152 formed in the side piece 88 that supports arm 144. A trowel 154 is pivotally and frictionally secured to the forward end of arm 144 by a pin 156.

An elongate head position control member 155 as best seen in FIG. 2 is slidably supported on member 66 by a number of spaced guides 158. A guide plate 160 is secured to the bifurcated end 96 as shown in FIG. 4 and slidably engages the upper portion of member 156. A compressed helical spring 162 abuts against guide plate 160. The upper end of spring 162 engages a protuberance 164 secured to member 156 as shown in FIG. 4. The spring-loaded member 156 is at all times urged upwardly to engage a space between a pair of the teeth 100 to hold head assembly E at a desired angle relative to member 66 as shown in FIGS. 4, 6 and 7. Members 134 and 155 as may best be seen in FIG. 2 have handles 134a and 155a formed on the lower ends thereof.

The second form of apparatus D is used by mounting one of the reels C on which the composite tape B has been wound on shaft 68 as shown in FIG. 2. A transverse pin 166 that extends between aligned openings (not shown) in the sides 80 of reel C is removed therefrom. Pin 166 is shown in position on the sides 42 in FIG. 5. The pin 166 serves to prevent the outer free end portion of composite tape B from inadvertently separating from the balance of the spiral wound tape on the reel.

An end portion of film 12 from reel C is now secured to roller 78, and a length of tape B' that includes only the strip paper 10 and layer of bonding agent 14 is extended upwardly to the head E. As the tape B' is pulled upwardly towards head E, the sides 42 of reel C rotate roller 78 in a direction opposite to that in which the reel rotates, and film 12 is wound on to the roller 78. Tape B' as best seen in FIGS. 2, 6 and 7 extends upwardly over feed roller 106 for the paper 10 thereof to be positively engaged by the pins 108. Guide roller 112 is formed from a material to which the layer of bonding agent 14 will adhere. The layer 14 of tape B' is in adhering contact with the under side of guide roller 112 as shown in FIGS. 6 and 7.

The portion of tape B' on head E extends under blade 118, and the paper 10 of this portion being slidably supported on the upper surface of wiper bar 142. Trowel 154 may be adjusted to the operative position illustrated in FIG. 7, or to the nonoperative position shown in FIG. 6 at the discretion of the operator (not shown). Likewise, the head E may be adjusted to a desired angular position relative to the bifurcated end 96 by movement of member 155 as previously described.

The head E is now brought adjacent to a flat surface 166 as shown in FIGS. 6 and 7 that may be either a ceiling or wall, and moved relative thereto, with the layer 14 of tape B' on head E being in adhering contact therewith. Tape B' adheres to surface 166 and a desired length of the tape is applied thereto. During the application of the tape B' to surface 166, the wiper bar 142 forces the tape into pressure contact therewith when the mode of application is as shown in FIG. 6. When the head E is used for the application of tape B' as illustrated in FIG. 7, the tape is applied to surface 166 by both the wiper bar 142 and trowel 154.

When a desired length of tape B' has been applied to surface 166, handle 134a shown in FIG. 2 is moved downwardly relative to member 66. Such downward movement of handle 134a results in blade 118 being pivoted into slot 120 to transversely sever the tape B' on head E.

Upon the blade 118 engaging web 90 a sufficient downward force is exerted on cam surfaces 130 and 132 to cause them to separate. Member 134 may now be moved longitudinally away from rod 122. Actuating member 134 has a collar 168 mounted thereon from which a slack cable 170 extends to pass through an arcuate guide 172 secured to the external surface of the sidepiece 88 shown in full view in FIG. 3. Cable 170 extends rearwardly from guide 172 to pass through an opening (not shown) in lug 140, and then through the length of spring 138 to be secured to shaft 104. A transverse area 174 extends from collar 168 to the opposite side of bifurcated end portion 96. The arm 174 on the free end portion thereof (not shown) has a second slack cable (not shown) that is arranged in the same manner as cable 170 and performs the same function.

After the cam surfaces 130 and 132 have separated further downward movement of member 134 results in the two cables 170 becoming taut, and advancing the feed roller 106 forwardly on frame 86. Such advancement of feed roller 106 results in a forward section of tape B' being moved relative to head E to extend under blade 118 and rest on cutter bar 142.

Feed roller 106 when advancing forwardly on head E, tends to rotate in a counter clockwise direction as viewed in FIG. 3 on shaft 104, but is prevented from so doing by a conventional mechanism (not shown) within the roller that allows the roller to rotate clockwise only relative to the shaft. Shaft 104 has end portions (not shown) of square transverse cross section within slots 102 to prevent rotation of the shaft.

When the downward force is released from handle 134a the compressed helical springs 138 move the shaft 104 and feed roller 106 rearwardly on frame E to the position shown in FIG. 3. As such rearward movement takes place, the feed roller 106 rotates clockwise as viewed in FIG. 3, with the pins 108 remaining in engagement with the section B' of tape that extends across head E. The expansion of springs 138 also move the member 134 towards head E to the extent that cam surfaces 130 and 132 are caused to engage and occupy the positions as shown in FIG. 3.

As the portion of tape B' on head E is advanced as previously described, the layer 14 thereon remains in adhering contact with guide roller 112 and causes counter clockwise rotation of the latter to dispose the forward extremity of the tape over wiper bar 142. Guide roller 112 has conventional means (not shown) on the interior thereof to prevent clockwise rotation of the roller on bail 110, as the feeder roller 106 moves rearwardly on frame 86 to the position shown in FIG. 3. After the tape B' on head E has been cut as above described a second length of tape may be applied by placing the layer 14 of tape B' above wiper bar 142 in pressure contact with surface 166. The tape applying operation above described is then repeated.

In those situations where but a limited quantity of tape B' is to be applied to a surface, it is convenient to rotatably support a reel C on which composite tape B is wound in a housing 176 shown in FIG. 8 in frictional contact with a rotatably supported film receiving roller 178. A free end section of tape B' projects from a transverse slot (not shown) in the housing 176. As the tape B' is drawn from housing 176, the film 12 from the composite tape B is wound on roller 178. The housing 176 may be the package in which tape B is retailed.

I claim:

1. A device for applying tape coated on a first side thereof with a bonding material to a flat surface, said tape prior to application having the exposed surface of said bonding material covered with an elongate strip of pliable film that may be stripped from said bonding material without dislodging the latter from said tape, said tape, bonding agent and film prior to use being spiral wound on a reel having two laterally spaced sides and a transverse opening in the center of said reel, said device including:
    a. an elongate first rigid member;
    b. a first stub shaft that extends outwardly from a first end portion of said rigid member, which shaft rotatably supports said reel;
    c. a second stub shaft supported from said member and longitudinally movable relative thereto;
    d. a roller of greater width than said reel rotatably supported on said second stub shaft;
    e. spring means for maintaining said roller in frictional contact with said sides of said reel, said roller having the outer end of said film attached thereto, and said roller having said film wound thereon as said tape is drawn from said reel and causes the latter to rotate;
    f. a tape-applying head assembly mounted on the end of said member most remote from said reel, said assembly including an elongate frame that has said tape extending thereto from said reel, said frame including two parallel laterally spaced sidepieces and a transverse web that connects the forward ends thereof, said side pieces having two transversely aligned slots in the rearward portions thereof, a transverse wiper bar mounted on said web for forcing the bonding material of said tape into adhering contact with a surface when said head assembly is moved relative to said surface, a transverse cutter blade pivotally supported from said frame for severing said tape after a desired length thereof has been applied to said surface, first means on said frame for advancing said tape on said head to the extent that a portion thereof rests on said wiper bar after said length has been severed from said tape, said first means including:
        1. a shaft slidably but nonrotatably supported in said slots between said sidepieces;
        2. a feed roller over which said tape extends, said feed roller mounted on said shaft for rotation thereon in a first direction only;
        3. a plurality of spaced protuberances on the external surface of said feed roller that positively engage the paper portion of the section of tape that extends over said feed roller; and
        4. spring means operatively associated with said shaft and feed roller that return said shaft and feed roller to a first position at the rear extremity of said frame after said shaft and feed roller have been moved forwardly to a second position on said frame by actuation of said second means to advance said tape, said feed roller rotating relative to said tape when said feed roller returns from said second to said first position; and
    g. second manually operable means that are actuatable from a position on said member remote from said head to first move said cutter blade to sever said tape and then move said first means to advance said tape on said head.

2. A device as defined in claim 1 which in addition includes:
    h. third means for adjustably supporting said head at any one of a plurality of desired positions relative to said elongate member.

3. A device as defined in claim 1 in which said second means includes:
    k. a downturned L-shaped member secured to a free end of said cutter blade, said L-shaped member having a first engageable cam surface on the free end thereof;
    l. a second elongate member slidably supported for longitudinal movement on said first member, said second member having a second engageable cam surface on a first end thereof that removably engages said first cam surface, and separates therefrom after said second member has been manually moved relative to said first member to the extent that said cutter blade has been pivoted a sufficient distance to sever said tape on said head;
    m. two guides extending outwardly from said sidepieces forwardly of said slots;
    n. two slack cables secured to the ends of said shaft and extending forwardly through said guides to be secured to said second member, with said second member after it is moved longitudinally on said first member beyond the point at which said first and second cam surfaces disengage tensioning said cables to move said shaft and feed roller forwardly to said second position, and said first member when moved towards said head causing said first and second cam surfaces to again engage and allowing said spring means to return said shaft and feed roller from said second first position.

4. A device as defined in claim 3 which further includes a guide roller rotatably supported for rotation in a first direction only above said frame intermediate said feed roller and cutter blade, with said guide roller being formed from a material to which said bonding material adheres, which bonding material on the section of said tape on said head sequentially engages the lower portion of said guide roller to rotate the latter as said tape is advanced on said head, with said guide roller holding a section of said tape to extend over said wiper bar when said feed roller returns from said second to said first position.

* * * * *